(12) United States Patent
Nako et al.

(10) Patent No.: US 11,691,227 B2
(45) Date of Patent: Jul. 4, 2023

(54) SOLID WIRE FOR ELECTROSLAG WELDING, AND WELDING JOINT

(71) Applicant: Kobe Steel, Ltd., Kobe (JP)

(72) Inventors: Hidenori Nako, Hyogo (JP); Tomoko Sugimura, Hyogo (JP); Keito Ishizaki, Kanagawa (JP); Yoshihiko Kitagawa, Kanagawa (JP)

(73) Assignee: Kobe Steel, Ltd., Kobe (JP)

( * ) Notice: Subject to any disclaimer, the term of this patent is extended or adjusted under 35 U.S.C. 154(b) by 0 days.

(21) Appl. No.: 17/045,564

(22) PCT Filed: May 17, 2019

(86) PCT No.: PCT/JP2019/019730
§ 371 (c)(1),
(2) Date: Oct. 6, 2020

(87) PCT Pub. No.: WO2019/221284
PCT Pub. Date: Nov. 21, 2019

(65) Prior Publication Data
US 2021/0154777 A1    May 27, 2021

(30) Foreign Application Priority Data

May 17, 2018  (JP) ................... 2018-095768
May 9, 2019   (JP) ................... 2019-089329

(51) Int. Cl.
*B23K 35/30*    (2006.01)
*B23K 35/02*    (2006.01)
(Continued)

(52) U.S. Cl.
CPC ...... *B23K 35/3066* (2013.01); *B23K 35/0261* (2013.01); *B23K 35/362* (2013.01);
(Continued)

(58) Field of Classification Search
None
See application file for complete search history.

(56) References Cited

U.S. PATENT DOCUMENTS

2006/0102253 A1*  5/2006  Berglund ............... C22C 38/44
                                                                 148/318
2010/0206130 A1*  8/2010  Nako ................ B23K 35/3066
                                                                  75/302
(Continued)

FOREIGN PATENT DOCUMENTS

JP    2001107196 A  *  4/2001
JP    2005-305471       11/2005
(Continued)

OTHER PUBLICATIONS

International Search Report dated Aug. 13, 2019 in PCT/JP2019/019730, (with English translation), 3 pages.
(Continued)

*Primary Examiner* — Xiaobei Wang
(74) *Attorney, Agent, or Firm* — Oblon, McClelland, Maier & Neustadt, L.L.P.

(57) ABSTRACT

A solid wire for electroslag welding, including Fe and, by mass % based on a total mass of the wire: C: more than 0% and 0.03% or less; Si: more than 0% and 0.10% or less; Mn: more than 0% and 0.25% or less; Ni: 10.5%-14.0%; S: more than 0% and 0.010% or less; Al: more than 0% and 0.250% or less; REM: 0.002%-0.080%; and O: more than 0% and 0.0090% or less.

10 Claims, 1 Drawing Sheet (51) Int. Cl.
*B23K 35/362* (2006.01)
*C22C 38/00* (2006.01)
*C22C 38/02* (2006.01)
*C22C 38/04* (2006.01)
*C22C 38/06* (2006.01)
*C22C 38/42* (2006.01)
*C22C 38/54* (2006.01)

(52) U.S. Cl.
CPC .......... *C22C 38/002* (2013.01); *C22C 38/005* (2013.01); *C22C 38/02* (2013.01); *C22C 38/04* (2013.01); *C22C 38/06* (2013.01); *C22C 38/42* (2013.01); *C22C 38/54* (2013.01); *Y10T 428/12951* (2015.01); *Y10T 428/12958* (2015.01)

(56) References Cited

U.S. PATENT DOCUMENTS

2016/0129532 A1   5/2016   Saruwatari et al.
2019/0210166 A1*  7/2019   Ishizaki ............. B23K 35/0266

FOREIGN PATENT DOCUMENTS

| JP | 2010-172907 | * | 8/2010 |
| JP | 5244059 B2 | | 7/2013 |
| JP | 2015-9247 A | | 1/2015 |
| JP | 2015137419 A | * | 7/2015 |
| JP | 2016-20004 A | | 2/2016 |
| JP | 5880662 B2 | | 3/2016 |
| JP | 2016-93823 A | | 5/2016 |
| JP | 2018-043288 | * | 3/2018 |
| WO | WO 2018/051823 A1 | | 3/2018 |

OTHER PUBLICATIONS

Written Opinion of the International Searching Authority dated Aug. 13, 2019 in PCT/JP2019/019730, (with English translation), 9 pages.

* cited by examiner

SOLID WIRE FOR ELECTROSLAG WELDING, AND WELDING JOINT

TECHNICAL FIELD

The present invention relates to a solid wire for use in electroslag welding of 5.0%-10.0% Ni steel which is steel for cryogenic service to be applied to a tank for storing liquefied natural gas or the like at a low temperature or a chemical plant using the same gas, and a weld joint obtained using the solid wire.

BACKGROUND ART

9% Ni steel has high strength and excellent cryogenic toughness at an ultralow temperature such as a liquid nitrogen temperature (−196° C.). The 9% Ni steel is therefore typically used as a base metal for manufacturing, by welding, storage tanks for storing liquefied natural gas (LNG) and the like at a low temperature. Those storage tanks are required to have excellent cryogenic toughness in a temperature range of −162° C. or less, which is a temperature range of liquid such as LNG. Therefore, a weld metal (i.e., weld portion) of a weld joint formed by welding the 9% Ni steel is likewise required to also have high strength and excellent cryogenic toughness.

In the background art, a welding method such as coated arc welding, submerged arc welding or automatic TIG (Tungsten Inert Gas) welding using an Ni-based weld material has been used for welding of the 9% Ni steel. A weld metal obtained by these welding methods is excellent in cryogenic toughness, but has lower strength than the 9% Ni steel which is the base metal. Thus, there is a problem that a designed plate thickness of a structure must be increased in accordance with the strength of an Ni-based weld metal portion. On the other hand, each of iron and steel companies has promoted reduction of an Ni amount in steel for cryogenic service, and has researched to put 7% Ni steel or 5% Ni steel into practical use.

Patent Literatures 1 to 5 propose solid wires for welding steel for cryogenic service or flux-cored wires for gas metal arc welding (GMAW).

CITATION LIST

Patent Literature

Patent Literature 1: JP-A-2015-9247
Patent Literature 2: JP-A-2016-20004
Patent Literature 3: JP-A-2016-93823
Patent Literature 4: Japanese Patent No. 5880662
Patent Literature 5: Japanese Patent No. 5244059

SUMMARY OF INVENTION

Technical Problem

However, according to each of the inventions stated in Patent Literatures 1 to 5, a heat input is about 1.4 kJ/mm to 2.2 kJ/mm with efficiency improved by gas metal arc welding using pure Ar or Ar containing 2% or less oxygen, carbon dioxide gas or He gas, in comparison with TIG welding. However, an operation method with higher efficiency is desired.

The present inventors have studied use of electroslag welding, which has not been studied in the background art in welding using a weld material of about 6.0%-15.0% Ni, as an operation method for achieving high efficiency welding with a heat input which is, for example, 10 kJ/mm or more.

Here, the electroslag welding is a method in which a welding wire is put into a molten slag bath formed inside a groove surrounded by a base metal and each water-cooled copper backing plate such that the base metal and the welding wire are molten and welded mainly using Joule heat of the molten slag as a heat source, thereby performing welding. In the electroslag welding, it is possible to perform vertical position welding of a structure having a large plate thickness, as in a shipbuilding field, an industrial machinery field or the like, in one pass. There is therefore an advantage that the electroslag welding is higher in efficiency than common arc welding requiring multi-pass welding.

However, in the electroslag welding, the heat input during the welding is large and the weld metal is held for long hours at a high temperature. Accordingly, the structure of the weld metal is conspicuously coarsened such that it is difficult to ensure sufficient cryogenic toughness. Particularly, a cooling rate in the vicinity of the water-cooled copper backing plate during the welding is conspicuously large, and the strength of the weld metal in such a region locally increases. As a result, there is a possibility that an absorbed energy decreases and the cryogenic toughness deteriorates.

In consideration of the above, an object of the present invention is to provide a solid wire for electroslag welding by which a weld joint including a weld metal excellent in strength and also excellent in cryogenic toughness due to refinement of the structure of the weld metal can be produced with high efficiency using a heat input of, for example, 10 kJ/mm or more, and the weld joint including the weld metal.

Solution to Problem

In order to solve the foregoing problem, the present inventors have further studied intensively. As a result, the present inventors have found that the strength and the cryogenic toughness of the weld metal are excellent in the case where the solid wire for electroslag welding and the chemical component of the weld metal using the solid wire satisfy specific conditions. More specifically, the present inventors have found out that the aforementioned problem can be solved in the following manner. That is, an upper limit of the content of each of elements such as Si, Mn and Ni in the solid wire is restricted to a predetermined amount or less, thereby preventing an excessive increase of the strength. In addition, a predetermined amount of REM (Rare Earth Metal) is added, thereby exhibiting an intragranular transformation structure (acicular ferrite) originating at an inclusion in the weld metal in the weld joint. Thus, the structure of the weld metal is refined. The present invention has been accomplished based on this finding.

That is, a solid wire for electroslag welding in the present invention, contains, by mass % based on total mass of the wire:

C: more than 0% and 0.03% or less;
Si: more than 0% and 0.10% or less;
Mn: more than 0% and 0.25% or less;
Ni: 10.5%-14.0%;
S: more than 0% and 0.010% or less;
Al: more than 0% and 0.250% or less;
REM: 0.002%-0.080%; and
O: more than 0% and 0.0090% or less,
with the balance being Fe and unavoidable impurities.

In one aspect of the present invention, the solid wire for electroslag welding may further contain, by mass % based on total mass of the wire, either one or both of:
Ca: 0.005%-0.050%; and
Mg: 0.001%-0.020%.

In one aspect of the present invention, the solid wire for electroslag welding may further contain, by mass % based on total mass of the wire,
Cu: more than 0% and 1.00% or less.

In one aspect of the present invention, the solid wire for electroslag welding may further contain, by mass % based on total mass of the wire, at least one element selected from the group consisting of:
Cr: more than 0% and 0.50% or less;
Mo: more than 0% and 0.50% or less;
W: more than 0% and 0.50% or less;
Nb: more than 0% and 0.10% or less;
V: more than 0% and 0.10% or less; and
B: more than 0% and 0.010% or less, and
in which the solid wire for electroslag welding may satisfy the following relationship (1):

$$Cr+Mo+W \leq 0.50 \quad (1).$$

In one aspect of the present invention, the solid wire for electroslag welding may be plated with Cu.

In addition, a weld joint of the present invention includes a weld metal containing, by mass %:
C: more than 0% and 0.07% or less;
Si: more than 0% and 0.30% or less;
Mn: more than 0% and 0.40% or less;
Ni: 10.5%-14.0%;
S: more than 0% and 0.0065% or less; and
Al: 0.008%-0.220%,
with the balance being Fe and unavoidable impurities,
in which a total area fraction SA (%) of high-angle grains with an equivalent circle diameter of 5 μm to 30 μm among high-angle grains surrounded by grain boundaries with crystal orientation of 15° or more is 30% or more.

In the weld joint in one aspect of the present invention, the weld metal may further contain, by mass %,
REM: more than 0% and 0.040% or less.

In the weld joint in one aspect of the present invention, the weld metal may further contain, by mass %,
REM: more than 0.040% and 0.080% or less.

In the weld joint in one aspect of the present invention, the weld metal may further contain, by mass %,
Ca: 0.0003%-0.010%.

In the weld joint in one aspect of the present invention, the weld metal may further contain, by mass %,
Cu: more than 0% and 1.00% or less.

In the weld joint in one aspect of the present invention, the weld metal may further contain, by mass %, at least one element selected from the group consisting of:
Cr: more than 0% and 0.50% or less;
Mo: more than 0% and 0.50% or less;
W: more than 0% and 0.50% or less;
Nb: more than 0% and 0.10% or less;
V: more than 0% and 0.10% or less; and
B: more than 0% and 0.010% or less,
in which the weld metal may satisfy the following relationship (2):

$$Cr+Mo+W \leq 0.50 \quad (2).$$

In the weld joint in one aspect of the present invention, the weld metal may further contain, by mass %:
O: more than 0% and 0.040% or less; and
N: 0% or more and 0.010% or less.

In the weld joint in one aspect of the present invention, a steel plate containing 5% to 10% of Ni may be used as a base metal.

Advantageous Effects of Invention

In the solid wire for electroslag welding in the present invention, a weld joint provided with a weld metal excellent in strength and also excellent in cryogenic toughness due to refinement of structure of the weld metal can be produced with high efficiency of, for example, a heat input of 10 kJ/mm or more.

DESCRIPTION OF EMBODIMENTS

The present invention will be described below in detail with reference to an embodiment. Hereinafter, "%" denotes mass % unless otherwise specifically noted. In addition, "-" denotes a range of not less than a lower limit value and not more than an upper limit value. In addition, in the description of the present invention, a solid wire for electroslag welding may be referred to as wire simply.

(Solid Wire for Electroslag Welding)

Components of the solid wire for electroslag welding according to the embodiment of the present invention will be described as follows.

C: more than 0% and 0.03% or less

C is an element which hardens a solid solution and forms a compound to contribute to ensuring strength. In order to effectively exert the aforementioned effect, the content of C is preferably 0.001% or more. However, in the case where an excessive amount of C is added, the strength excessively increases. Thus, cryogenic toughness deteriorates. Therefore, the content of C is set to be 0.03% or less. The content of C is preferably 0.010% or less, and more preferably 0.008% or less.

Si: more than 0% and 0.10% or less

Si is a deoxidizing element, which has an effect of reducing the concentration of oxygen in a weld metal to improve the cryogenic toughness. In order to effectively exert the aforementioned effect, the content of Si is preferably 0.003% or more. However, excessive addition of Si causes an excessive increase of the strength at an ultralow temperature due to solid-solution hardening so that the cryogenic toughness deteriorates. Therefore, the content of Si is set to be 0.10% or less. The content of Si is preferably 0.08% or less, and more preferably 0.07% or less.

Mn: more than 0% and 0.25% or less

Mn is a deoxidizing element, which has an effect of reducing the concentration of oxygen in the weld metal to improve the cryogenic toughness. In order to effectively exert the aforementioned effect, the content of Mn is preferably 0.005% or more, and more preferably 0.01% or more. However, excessive addition of Mn causes an excessive increase of the strength at an ultralow temperature due to solid-solution hardening so that the cryogenic toughness deteriorates. Therefore, the content of Mn is set to be 0.25% or less. The content of Mn is preferably 0.20% or less, and more preferably 0.10% or less.

Ni: 10.5%-14.0%

Ni is an essential element for ensuring toughness at a low temperature, and also an effective element for generally improving matrix toughness of the weld metal at a low temperature, thereby preventing intergranular fracture in a region where a cooling rate of the weld metal is large. Therefore, the content of Ni is set to be 10.5% or more. The content of Ni is preferably 10.8% or more, and more preferably 11.0% or more. However, excessive addition of Ni causes an increase of the strength so that the cryogenic toughness deteriorates. Therefore, the content of Ni is set to be 14.0% or less. The content of Ni is preferably 13.0% or less, and more preferably 12.8% or less.

S: more than 0% and 0.010% or less

S is an element contained as an unavoidable impurity. However, in the region where the cooling rate of the weld metal is large, an impurity such as S is segregated into prior austenite grain boundaries so that grain-boundary bonding force deteriorates and intergranular fracture becomes likely to occur. Accordingly, in order to excellently prevent the intergranular fracture, the content of S is set to be 0.010% or less. The content of S is preferably 0.008% or less, and more preferably 0.006% or less. Since S is contained as an unavoidable impurity, the content of S is defined to be more than 0%.

Al: more than 0% and 0.250% or less

Al serves as a deoxidizing element, which has an effect of stably reducing the content of oxygen in the weld metal. The content of Al is preferably 0.010% or more, and more preferably 0.015% or more. However, if Al is excessively added, the cryogenic toughness cannot be ensured. Therefore, the content of Al is set to be 0.250% or less. The content of Al is preferably 0.200% or less, and more preferably 0.180% or less.

REM: 0.002%-0.080%

REM is an element, which forms a sulfide having excellent lattice matching with a ferrite-phase on the surfaces of particles of an inclusion in the weld metal in a weld joint, thereby accelerating formation of a fine acicular ferrite structure originating at the inclusion and improving cryogenic toughness. Therefore, the content of REM is set to be 0.002% or more. The content of REM is preferably 0.010% or more, and more preferably 0.012% or more. However, excessive addition of REM leads to coarsening of the inclusion to promote brittle fracture originating at the coarsened inclusion so that it is impossible to ensure the cryogenic toughness. Therefore, the content of REM is set to be 0.080% or less. The content of REM is preferably 0.060% or less, and more preferably 0.045% or less.

The element of REM defined in the present embodiment is not specified particularly. For example, only one kind of element may be selected from elements such as Sc, Y, La, Ce Pr, Nd, etc. or two or more kinds of them may be used in combination.

In addition, REM likely to form an oxide or a sulfide in the weld metal and float and separate. Accordingly, in the case where REM is added into the wire, a residual ratio of REM in the metal is often so small as to fall below a lower detection limit of component analysis. In the present embodiment, REM contained in the weld metal to fall below the lower detection limit is treated as an impurity.

O: more than 0% and 0.0090% or less

O is an element contained as an unavoidable impurity. However, O forms a coarse oxide to deteriorate the cryogenic toughness. Accordingly, the content of O is set to be 0.0090% or less. The content of O is preferably 0.0080% or less, and more preferably 0.0070% or less.

Since O is contained as an unavoidable impurity, the content of O is defined to be more than 0%.

Ca: 0.005%-0.050%

Ca is not an essential element for the wire according to the present embodiment. However, Ca is an element which forms a sulfide having excellent lattice matching with the ferrite-phase on the surfaces of particles of the inclusion in the weld metal in the weld joint, thereby accelerating formation of a fine acicular ferrite structure originating at the inclusion and improving the cryogenic toughness. Therefore, 0.005% or more of Ca is preferably contained. In addition, the content of Ca is preferably 0.007% or more, and more preferably 0.008% or more.

However, excessive addition of Ca leads to coarsening of the inclusion to promote brittle fracture originating at the coarsened inclusion so that it is impossible to ensure the cryogenic toughness. Therefore, the content of Ca is set to be 0.050% or less. In addition, the content of Ca is preferably 0.040% or less, and more preferably 0.035% or less.

Mg: 0.001%-0.020%

Mg is not an essential element for the wire according to the present embodiment. However, Mg is an element which forms an oxide having excellent lattice matching with the ferrite-phase on the surfaces of particles of the inclusion in the weld metal in the weld joint, thereby accelerating formation of a fine acicular ferrite structure originating at the inclusion and improving the cryogenic toughness. Therefore, 0.001% or more of Mg is preferably contained. In addition, the content of Mg is preferably 0.0012% or more, and more preferably 0.0040% or more.

However, excessive addition of Mg leads to coarsening of the inclusion to promote brittle fracture originating at the coarsened inclusion so that it is impossible to ensure the cryogenic toughness. Therefore, the content of Mg is set to be 0.020% or less. In addition, the content of Mg is preferably 0.018% or less, and more preferably 0.016% or less.

Mg is likely to form an oxide in a molten metal to float and separate. Therefore, in the case where Mg is added into the wire, a residual ratio of Mg in the weld metal is often so small as to fall below a lower detection limit of component analysis. In the present embodiment, Mg contained in the weld metal to fall below the lower detection limit is treated as an impurity.

In the present embodiment, Ca and Mg are elements having a similar effect. Therefore, the wire may contain a predetermined amount of either Ca or Mg, or may contain both of Ca and Mg.

Cu: more than 0% and 1.00% or less

Cu is not an essential element for the wire according to the present embodiment. However, Cu has an effect of improving strength at room temperature while preventing an increase of the strength at an ultralow temperature, thereby improving a balance between the cryogenic toughness and the room temperature strength. Therefore, Cu is preferably contained. The content of Cu is more preferably 0.01% or more, and even more preferably 0.08% or more. However, excessive addition of Cu leads to excessive increase of strength so that it is impossible to ensure the cryogenic toughness. Therefore, the content of Cu is set to be 1.00% or less. The content of Cu is preferably 0.50% or less, more preferably 0.40% or less, and even more preferably 0.30% or less.

In addition, the wire preferably contains at least one element selected from the group consisting of Cr: more than 0% and 0.50% or less, Mo: more than 0% and 0.50% or less, W: more than 0% and 0.50% or less, Nb: more than 0% and 0.10% or less, V: more than 0% and 0.10% or less, and B: more than 0% and 0.10% or less, and satisfies the following relationship (1).

Cr, Mo and W in the relationship (1) denote contents (mass %) of each element based on the total mass of the wire. The units thereof are omitted.

$$Cr+Mo+W \leq 0.50 \tag{1}$$

Cr, Mo, W, Nb, V and B are elements contributing to ensuring the strength. In the case where the wire contains a predetermined amount of at least one of Cr, Mo, W, Nb, V and B and satisfies the relationship (1), an effect of improving the strength can be obtained without largely deteriorating the toughness.

Each of the contents of Cr, Mo and W is preferably 0.01% or more, and more preferably 0.02% or more. In addition, each of the contents of Cr, Mo and W is preferably 0.30% or less, and more preferably 0.15% or less.

Each of the contents of Nb and V is preferably 0.005% or more, and more preferably 0.008% or more. In addition, each of the contents of Nb and V is preferably 0.050% or less, and more preferably 0.045% or less.

The content of B is preferably 0.0005% or more, and more preferably 0.0008% or more. In addition, the content of B is preferably 0.0050% or less, and more preferably 0.0045% or less.

The parameter on the left-hand side of the relationship (1) is preferably 0.40 or less, and more preferably 0.38 or less. In addition, the parameter on the left-hand side of the relationship (1) may be 0.

The solid wire for electroslag welding according to the present embodiment can contain other components, which are, for example, Fe as a fundamental component and unavoidable impurities similarly to the target base metal. In an aspect, the balance is Fe and the unavoidable impurities. Examples of the unavoidable impurities include P, As, Sb, Sn, Bi, N, etc. Among them, each content of P, As, Sb, Sn and Bi is restricted to be 0.010% or less, and the content of N is restricted to be 0.005% or less. As long as the contents are within those ranges, the elements do not impede the effect of the present embodiment in the case where the elements are contained as unavoidable impurities, or even in the case where the elements are added intentionally.

The surface of the solid wire for electroslag welding according to the present embodiment is preferably plated with Cu in order to enhance electric conductivity. The plating amount of Cu is preferably 0.10% or more, and preferably 0.30% or more.

(Weld Joint)

By performing electroslag welding by use of the aforementioned solid wire for electroslag welding, a weld joint including a weld metal which is excellent in strength and cryogenic toughness can be produced with high efficiency of, for example, a heat input of 10.0 kJ/mm or more. Components (elements) in the weld metal in the aforementioned weld joint are the same as in the solid wire for electroslag welding. The function and effect of each of the components are also the same. Accordingly, in the following description, the functions and effects of the same components as those of the aforementioned solid wire for electroslag welding will be omitted in order to avoid duplication of the description. Therefore, only preferable ranges of the components will be mentioned.

C: more than 0% and 0.07% or less
Preferable upper limit: 0.05%, more preferably 0.04%
Preferable lower limit: 0.003%, more preferably 0.008%
Si: more than 0% and 0.30% or less
Preferable upper limit: 0.25%, more preferably 0.18%
Preferable lower limit: 0.005%, more preferably 0.010%
Mn: more than 0% and 0.40% or less
Preferable upper limit: 0.37%, more preferably 0.34%
Preferable lower limit: 0.05%
Ni: 10.5%-14.0%
Preferable upper limit: 13.0%, more preferably 12.8%
Preferable lower limit: 10.8%, more preferably 11.0%
S: more than 0% and 0.0065% or less
Preferable upper limit: 0.0052%, more preferably 0.0045%
Al: 0.008%-0.220%
Preferable upper limit: 0.100%, more preferably 0.080%
Preferable lower limit: 0.010%, more preferably 0.015%

The aforementioned weld metal may further contain REM, Ca or Cu in the following component range.

REM: more than 0% and 0.040% or less
Preferable upper limit: 0.035%, more preferably 0.030%
Preferable lower limit: 0.003%, more preferably 0.004%
REM: more than 0.040% and not more than 0.080%
Preferable upper limit: 0.070%, more preferably 0.060%
Preferable lower limit: 0.045%, more preferably 0.050%
Ca: 0.0003%-0.010%
Preferable upper limit: 0.005%, more preferably 0.004%
Preferable lower limit: 0.0005%, more preferably 0.0010%
Cu: more than 0% and 1.00% or less
Preferable upper limit: 0.5%, more preferably 0.4%
Preferable lower limit: 0.01%, more preferably 0.08%

In addition, it is preferable that at least one element selected from the group consisting of Cr: more than 0% and 0.50% or less, Mo: more than 0% and 0.50% or less, W: more than 0% and 0.50% or less, Nb: more than 0% and 0.10% or less, V: more than 0% and 0.10% or less, and B: more than 0% and 0.10% or less is further contained, and the following relationship (2) is satisfied. Cr, Mo and W in the relationship (2) denote contents (mass %) of each element based on the total mass of the weld metal. The units thereof are omitted.

$$Cr+Mo+W \leq 0.50 \tag{2}$$

Each of the contents of Cr, Mo and W is preferably 0.01% or more, and more preferably 0.02% or more. In addition, each of the contents of Cr, Mo and W is preferably 0.30% or less, and more preferably 0.15% or less.

Each of the contents of Nb and V is preferably 0.005% or more, and more preferably 0.008% or more. In addition, each of the contents of Nb and V is preferably 0.050% or less, and more preferably 0.045% or less.

The content of B is preferably 0.0005% or more, and more preferably 0.0008% or more. In addition, the content of B is preferably 0.0050% or less, and more preferably 0.0045% or less.

The parameter on the left-hand side of the relationship (2) is preferably 0.40 or less, and more preferably 0.38 or less. In addition, the parameter on the left-hand side of the relationship (2) may be 0.

O: more than 0% and 0.040% or less

O forms an oxide. The oxide acts as a starting point of void formation in a Charpy test or acts as a starting point of brittle fracture. Thus, the cryogenic toughness deteriorates. Therefore, the content of O is preferably 0.040% or less, more preferably 0.035% or less, and even more preferably 0.0032% or less. Incidentally, since O is contained as an unavoidable impurity, the content of O is defined to be more than 0%.

N: 0% or more and 0.010% or less

N acts as a solid solution element reinforcing the matrix of the weld metal portion, and also acts as an element triggering the brittle fracture. Thus, the cryogenic toughness deteriorates. Therefore, the content of N is preferably 0.010% or less, more preferably 0.008% or less, even more preferably 0.006% or less, and most preferably N is not contained (including a case where the content of N is 0%).

The basic composition of the weld metal according to the present embodiment is as described above, and the balance is Fe and unavoidable impurities. Examples of the unavoidable impurities include P, As, Sb, Sn, Bi, etc. Among them, the content of each of P, As, Sb, Sn and Bi is restricted to be 0.010% or less. As long as the contents are within those ranges, the elements do not impede the effect of the present embodiment in the case where the elements are contained as unavoidable impurities, or even in the case where the elements are added intentionally.

In the weld metal according to the present embodiment, excellent toughness is realized by formation of the fine acicular ferrite structure originating at the inclusion including REM. Specifically, a total area fraction SA (%) of high-angle grains having an equivalent circle diameter of 5 μm to 30 μm among high-angle grains surrounded by grain boundaries with crystal orientation of 15° or more is controlled to be 30% or more. Thus, predetermined toughness is obtained. The SA is preferably 31% or more, and more preferably 32% or more.

It is preferable that a base metal used for producing the weld joint uses a steel plate containing 5% to 10% of Ni. In the case where the content of Ni is less than 5%, there is, for example, a problem that the cryogenic toughness cannot be ensured. The content of Ni is preferably 5.2% or more, and more preferably 6.5% or more. However, in the case where the content of Ni is more than 10%, the cost of the steel material increases. Therefore, the content of Ni is preferably 10% or less, and more preferably 9.5% or less.

(Flux)

During electroslag welding, flux is additionally put to compensate molten slag which is reduced with the advance of the welding. This flux is referred to as flux simply in the description. In the electroslag welding, with the advance of the welding, a molten metal is cooled and formed into a weld metal, and a part of a molten slag bath is formed into a molten slag layer. With the advance of the welding, the molten slag layer is cooled and formed into solidified slag. Thus, the molten slag is consumed. The flux is used for compensating the reduction of the molten slag bath.

The flux is roughly classified into fused flux and bonded (baked) flux. The fused flux is manufactured by melting and crushing various raw materials in an electric furnace or the like. On the other hand, the bonded flux is manufactured as follows. That is, various raw materials are bound by a binder such as alkaline silicate, granulated, and then baked. The bonded flux sometimes uses the aforementioned carbonate as a raw material. However, the carbonate is decomposed by heat during welding so as to generate $CO_2$ gas and increase the content of oxygen in the weld metal, thereby affecting the cryogenic toughness. It is therefore preferable to use the fused flux.

The flux used in the present embodiment is not limited particularly, but typically used in the following composition range.

CaO: 5%-60%

CaO is a basic component which is effective in adjusting the viscosity and the melting point of the molten slag, and which is also highly effective in reducing the content of oxygen in the weld metal. In the case where the content of CaO is less than 5%, the content of oxygen in the weld metal increases. Therefore, the content of CaO is preferably 5% or more, and more preferably 10% or more. However, in the case where the content of CaO is more than 60%, undercut and slag inclusion occur. Therefore, the content of CaO is preferably 60% or less, and more preferably 55% or less.

$CaF_2$: 3%-50%

$CaF_2$ is also a basic component which is effective in adjusting the viscosity and the melting point of the molten slag, and which is also highly effective in reducing the content of oxygen in the weld metal. In the case where the content of $CaF_2$ is less than 3%, the content of oxygen in the weld metal increases. Therefore, the content of $CaF_2$ is preferably 3% or more, and more preferably 5% or more. However, in the case where the content of $CaF_2$ is more than 50%, undercut and slag inclusion are more likely to occur, and welding is unstable due to fluoride gas generated during the welding. Therefore, the content of $CaF_2$ is preferably 50% or less, and more preferably 45% or less.

$BaF_2$: 0-20%

$BaF_2$ is also a basic component which is effective in adjusting the viscosity and the melting point of the molten slag, and which is also highly effective in reducing the content of oxygen in the weld metal. In the present embodiment, the viscosity and the melting point, and further the content of oxygen in the weld metal can be adjusted by other components. Thus, $BaF_2$ does not have to be contained. On the other hand, if contained, in the case where the content of $BaF_2$ is more than 20%, the melting point of the molten slag is so low that the viscosity is insufficient. Thus, the molten slag is too easily discharged from between a sliding copper backing plate and the weld metal. As a result, the weld metal cannot be held by the molten slag, and causes burn through. Therefore, the content of $BaF_2$ is preferably 20% or less, and more preferably 15% or less.

MgO: 0-20%

MgO is also a basic component which is effective in adjusting the viscosity and the melting point of the molten slag. In the present embodiment, the viscosity and the melting point can be adjusted by other components. Thus, MgO does not have to be contained. On the other hand, if contained, in the case where the content of MgO is more than 20%, the melting point of the molten slag is so high that the viscosity is also high, which causes a lack of penetration. Therefore, the content of MgO is preferably 20% or less, and more preferably 15% or less.

BaO: 0-20%

BaO is a basic component which is effective in adjusting the viscosity and the melting point of the molten slag, and which is also highly effective in reducing the content of oxygen in the weld metal. In the present embodiment, the viscosity and the melting point can be however adjusted by other components. Thus, BaO does not have to be contained. On the other hand, if contained, in the case where the content of BaO is more than 20%, the melting point of the molten slag is so low that the viscosity is insufficient. Thus, the molten slag is too easily discharged from between the sliding copper backing plate and the weld metal. As a result, the weld metal cannot be held by the molten slag, and causes burn through. Therefore, the content of BaO is preferably 20% or less, and more preferably 15% or less.

Na$_2$O: 0-10%

Na$_2$O is a component very effective in adjusting the viscosity of the molten slag. In the present embodiment, however, the viscosity and the melting point can be adjusted by other components. Thus, Na$_2$O does not have to be contained. On the other hand, if contained, in the case where the content of Na$_2$O is more than 10%, the melting point of the molten slag is so low that the viscosity is insufficient. Thus, the molten slag is too easily discharged from between the sliding copper backing plate and the weld metal. As a result, the weld metal cannot be held by the molten slag, and causes burn through. Therefore, the content of Na$_2$O is preferably 10% or less, and more preferably 7% or less.

K$_2$O: 0-10%

K$_2$O is a component very effective in adjusting the viscosity of the molten slag. In the present embodiment, however, the viscosity and the melting point can be adjusted by other components. Thus, K$_2$O does not have to be contained. On the other hand, if contained, in the case where the content of K$_2$O is more than 10%, the melting point of the molten slag is so low that the viscosity is insufficient. Thus, the molten slag is too easily discharged from between the sliding copper backing plate and the weld metal. As a result, the weld metal cannot be held by the molten slag, and causes burn through. Therefore, the content of K$_2$O is preferably 10% or less, and more preferably 7% or less.

SiO$_2$: 0-35%

SiO$_2$ is an acidic component which is a component for adjusting the viscosity and the melting point of the molten slag. In the present embodiment, the viscosity and the melting point can be adjusted by other components. Thus, SiO$_2$ does not have to be contained. On the other hand, if contained, in the case where the content of SiO$_2$ is more than 35%, the viscosity of the molten slag is high, which causes a lack of penetration. Therefore, the content of SiO$_2$ is preferably 35% or less, and more preferably 30% or less.

Al$_2$O$_3$: 0-65%

Al$_2$O$_3$ is a component effective in adjusting the viscosity and the melting point of the molten slag. In the present embodiment, the viscosity and the melting point can be adjusted by other components. Thus, Al$_2$O$_3$ does not have to be contained. On the other hand, if contained, in the case where the content of Al$_2$O$_3$ is more than 65%, the viscosity of the molten slag is high, which causes a lack of penetration. Therefore, the content of Al$_2$O$_3$ is preferably 65% or less, and more preferably 60% or less. In addition, the content of Al$_2$O$_3$ is preferably 3% or more.

TiO$_2$: 0-10% and ZrO$_2$: 0-10%

TiO$_2$ and ZrO$_2$ are components effective in adjusting the melting point of the molten slag. In the present embodiment, the melting point can be adjusted by other components. Thus, TiO$_2$ and ZrO$_2$ do not have to be contained. On the other hand, if contained, in the case where the content of each of TiO$_2$ and ZrO$_2$ is more than 10%, the viscosity increases suddenly near the melting point so as to easily cause slag inclusion. Therefore, the content of each of TiO$_2$ and ZrO$_2$ is preferably 10% or less, and more preferably 5% or less.

MnO: 0-20%

MnO is a component effective in adjusting the viscosity and the melting point of the molten slag. In the present embodiment, the viscosity and the melting point can be adjusted by other components. Thus, MnO does not have to be contained. On the other hand, if contained, in the case where the content of MnO is more than 20%, the melting point of the molten slag is so low that the viscosity is insufficient. Thus, the molten slag is too easily discharged from between the sliding copper backing plate and the weld metal. As a result, the weld metal which cannot be held by the molten slag, and causes burn through. Therefore, the content of MnO is preferably 20% or less, and more preferably 15% or less.

FeO: 0-5%

FeO is a component effective in adjusting the viscosity and the melting point of the molten slag, and is also highly effective in reducing the content of oxygen in the weld metal. In the present embodiment, the viscosity and the melting point can be adjusted by other components. Thus, FeO does not have to be contained. On the other hand, if contained, in the case where the content of FeO is more than 5%, slag generated in a bead surface is more likely to seize. Therefore, the content of FeO is preferably 5% or less, and more preferably 3% or less.

It is preferable that the composition of the flux has the contents of the components within each limited range thereof and satisfies the following relationship (3) in order to effectively reduce the content of oxygen in the weld metal and to improve the toughness of the weld metal portion. Each component such as CaO or CaF$_2$ in the relationship (3) designates a content (mass %) of the component based on the total mass of the flux.

$$(CaO+CaF_2+BaF_2+MgO+BaO+Na_2O+K_2O)/(SiO_2+0.5(Al_2O_3+TiO_2+ZrO_2+MnO+FeO)) \geq 1.00 \quad (3)$$

(The left-hand side is taken as >100 in the case where the flux does not contain any of SiO$_2$, Al$_2$O$_3$, TiO$_2$, ZrO$_2$, MnO and FeO.)

The preferable composition of the flux used in the present invention is the same as the aforementioned one with the balance being unavoidable impurities such as P, S, As, Sb, Sn, Bi, etc.

EXAMPLES

In the examples, weld metals were manufactured under the following welding conditions, using 9% Ni steel as a base metal, solid wires for electroslag welding having compositions shown in Table 1, and common fluxes containing SiO$_2$, CaO, CaF$_2$, MgO, Al$_2$O$_3$, FeO, BaO, TiO$_2$, etc. In Table 1 and Table 2, a symbol "-" in each component composition means that the content of the component is less than a detection limit in composition analysis or is not added at all.

In addition, all the solid wires were used as tested wires. All of these wires were plated with Cu. The Cu plating amount was set within a range of 0.10%-0.30%. The Cu plating amount of each wire in Table 1 is expressed as a total amount contained as an alloy in the wire excluding the Cu plating.

TABLE 1

| Wire Type | \multicolumn{13}{c}{Chemical Component Composition of Wire (Mass %, Balance being Fe and Unavoidable Impurities)} |
|---|---|---|---|---|---|---|---|---|---|---|---|---|---|
| | C | Si | Mn | Ni | S | Al | REM | O | Ca | Mg | Cu | Cr | B |
| A | 0.006 | 0.04 | 0.021 | 11.97 | 0.0054 | 0.048 | 0.050 | 0.0008 | — | — | — | — | — |
| B | 0.004 | 0.04 | 0.020 | 11.95 | 0.0051 | 0.15 | 0.045 | 0.0033 | — | — | — | — | — |
| C | 0.004 | 0.05 | 0.041 | 11.81 | 0.0049 | 0.077 | 0.003 | 0.0064 | 0.0110 | — | 0.3 | 0.010 | — |
| D | 0.002 | 0.07 | 0.024 | 11.89 | 0.0012 | 0.043 | 0.026 | 0.0036 | 0.0084 | 0.0014 | — | 0.012 | — |
| E | 0.002 | 0.07 | 0.024 | 11.83 | 0.0008 | 0.044 | 0.024 | 0.0014 | 0.0056 | 0.0093 | — | 0.011 | — |
| F | 0.006 | 0.04 | 0.010 | 12.04 | — | 0.090 | 0.036 | — | 0.032 | — | — | — | — |
| G | 0.002 | 0.08 | 0.17 | 12.30 | 0.0017 | 0.037 | 0.027 | 0.0019 | 0.0092 | 0.0066 | — | — | — |
| H | 0.002 | 0.08 | 0.17 | 12.05 | 0.0008 | 0.048 | 0.037 | 0.0016 | 0.0001 | 0.007 | — | — | — |
| I | 0.011 | 0.08 | 0.19 | 12.06 | 0.0007 | 0.043 | 0.053 | — | 0.011 | 0.014 | — | 0.010 | 0.0024 |
| J | 0.002 | 0.07 | 0.023 | 11.72 | 0.0041 | 0.040 | — | 0.0073 | 0.0170 | — | — | 0.013 | — |
| K | 0.004 | 0.05 | — | 10.01 | 0.0005 | 0.042 | — | 0.0024 | — | — | — | — | — |

Figure 1:
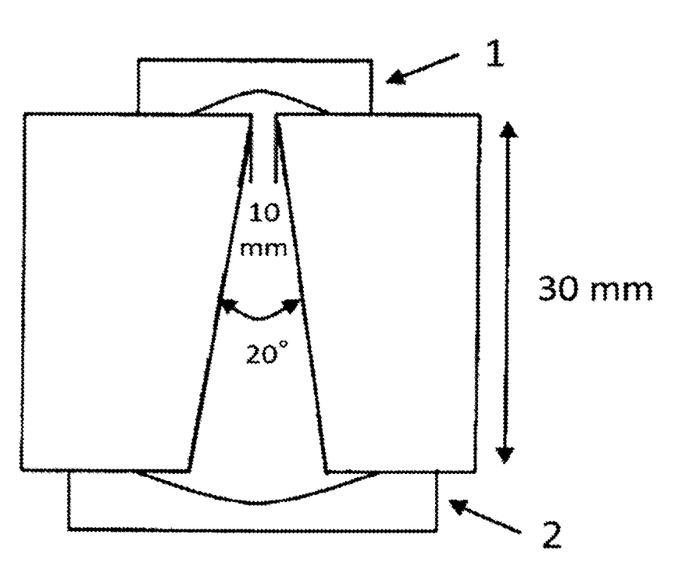
FIG. 1 is a view of a schematic configuration of groove welding in Examples.

In addition, as shown in FIG. 1, welding was performed on a 20° V-groove with a groove width of 10 mm surrounded by a copper backing plate 1 (on the back side of the groove) and a sliding copper backing plate 2 (on the front side of the groove). A water-cooled copper backing plate was used as each of the copper backing plate 1 and the sliding copper backing plate 2.

Welding method: electroslag welding
Welding conditions:
Plate thickness of base metal: 30 mm
Groove shape: see FIG. 1
Wire: see Table 1
Wire diameter=1.6 mm
Heat input condition: about 17.3 kJ/mm to 21.8 kJ/mm (welding current 340 A-400 A, welding voltage 32 V-40 V)
Welding posture: vertical one pass Compositions (each with the balance being Fe and unavoidable impurities) of weld metals obtained thus are shown in Table 2. Weld metals No. 1 and No. 2 used the same wire A but used different fluxes. Therefore, the compositions of the weld metals No. 1 and No. 2 are different from each other. Then, the following properties were evaluated for the aforementioned weld metals.

(Total Area Fraction of High-Angle Grains with Equivalent Circle Diameter of 5 μm to 30 μm Among High-Angle Grains Present in Weld Metal Structure: SA)

A position 7.5 μm distant from the plate surface of the weld metal in a section perpendicular to the welding direction was measured by EBSD (Electron Back-Scattered Diffraction).

EBSD Measurement Conditions
Apparatus: JEOL-5410 or JSM-IT100 made by JEOL Ltd.
Measurement area: 300 μm×300 μm
Step (pixel) size: 0.4 μm
Phases to be considered: ferrite and austenite EBSD data obtained thus were analyzed by analysis software OIM Analysis made by TSL solutions Ltd. Among data points, points whose confidence index indicating reliability of a measured azimuth was 0.100 or less were excluded from analysis targets, and units surrounded by grain boundaries whose crystal orientation was 15° or more with respect to adjacent pixels were defined as high-angle grains. In addition, a total area fraction SA (%) of high-angle grains with an equivalent circle diameter of 5 μm to 30 μm among the high-angle grains was calculated. In the Examples, the example whose SA was 30% or more was determined as preferable, the example whose SA was 31% or more was determined as more preferable, and the example whose SA was 32% or more was determined as even more preferable.

(Tensile Strength: TS)

An A2-type tensile test piece according to JIS Z3111 or a bar test piece with collar according to JIS G0567 was sampled from a central portion of each weld metal and in parallel with a weld line direction, and a tensile test was performed thereon by a method according to JIS Z2241. Each of the Examples in which the weld metal satisfied tensile strength TS>690 MPa was evaluated as acceptable.

(Cryogenic Toughness: $vE_{-196°\ C.}$)

A Charpy impact test piece (JIS Z3111 No. 4 V-notch test piece) was sampled perpendicularly to a weld line direction such that a central axis of the Charpy test piece was located at a position 7.5 mm distant from the plate surface of each obtained weld metal, and a Charpy impact test at −196° C. was performed thereon by a method according to JIS Z2242. Similar tests were performed three times, and an average value thereof was calculated. The weld metal which had an absorbed energy $vE_{-196°\ C.}$ of 40 J or more was evaluated as excellent in cryogenic toughness.

The reason why the Charpy impact test piece was sampled perpendicularly to the weld line direction such that the central axis of the Charpy test piece was located at the position 7.5 mm distant from the plate surface of each obtained weld metal was to examine the cryogenic toughness as to the weld metal close to the water-cooled copper backing plate and the sliding copper backing plate in which the cooling rate was particularly so high that the cryogenic toughness is more likely to deteriorate.

TABLE 2

| No. | Wire Type | \multicolumn{13}{c}{Chemical Component Composition of Weld Metal (Mass %, Balance being Fe and Unavoidable Impurities)} | \multicolumn{3}{c}{Evaluation} |
|---|---|---|---|---|---|---|---|---|---|---|---|---|---|---|---|---|---|
| | | C | Si | Mn | Ni | S | Al | REM | Ca | Cu | Cr | B | O | N | Mg | SA (%) | TS [MPa] | $vE_{-196°\ C.}$ [J] |
| 1 | A | 0.023 | 0.11 | 0.25 | 11.22 | 0.0042 | 0.037 | 0.034 | — | 0.089 | 0.012 | — | 0.032 | 0.0026 | — | 39.6 | 808 | 41 |
| 2 | A | 0.016 | 0.27 | 0.072 | 11.96 | 0.0024 | 0.058 | 0.057 | 0.0004 | 0.13 | 0.012 | — | 0.035 | 0.0028 | — | 34.1 | 805 | 49 |
| 3 | B | 0.022 | 0.13 | 0.27 | 11.16 | 0.0028 | 0.078 | 0.017 | — | 0.086 | 0.012 | — | 0.034 | 0.0019 | — | 39.3 | 783 | 43 |

TABLE 2-continued

| Wire | | Chemical Component Composition of Weld Metal (Mass %, Balance being Fe and Unavoidable Impurities) | | | | | | | | | | | | | | Evaluation | | |
| --- | --- | --- | --- | --- | --- | --- | --- | --- | --- | --- | --- | --- | --- | --- | --- | --- | --- | --- |
| No. | Type | C | Si | Mn | Ni | S | Al | REM | Ca | Cu | Cr | B | O | N | Mg | SA (%) | TS [MPa] | $vE_{-196°C}$ [J] |
| 4 | C | 0.035 | 0.12 | 0.35 | 10.91 | 0.0024 | 0.057 | — | 0.0006 | 0.230 | 0.012 | — | 0.023 | 0.0024 | — | 39.1 | 848 | 42 |
| 5 | D | 0.021 | 0.10 | 0.24 | 11.25 | 0.0008 | 0.046 | 0.005 | 0.0007 | 0.093 | 0.012 | — | 0.027 | 0.0020 | — | 37.2 | 784 | 46 |
| 6 | E | 0.019 | 0.11 | 0.24 | 11.30 | 0.0008 | 0.051 | 0.010 | 0.0011 | 0.099 | 0.011 | — | 0.028 | 0.0024 | — | 31.2 | 767 | 51 |
| 7 | F | 0.024 | 0.11 | 0.29 | 11.14 | 0.0005 | 0.090 | 0.018 | 0.0075 | 0.098 | — | — | 0.025 | 0.0024 | — | 44.8 | 816 | 40 |
| 8 | G | 0.017 | 0.09 | 0.31 | 11.60 | 0.0010 | 0.026 | 0.004 | 0.0017 | 0.12 | — | — | 0.023 | 0.0018 | — | 37.8 | 783 | 73 |
| 9 | H | 0.020 | 0.08 | 0.30 | 11.34 | 0.0008 | 0.031 | 0.006 | — | 0.12 | — | — | 0.019 | 0.0020 | — | 35.7 | 699 | 44 |
| 10 | I | 0.022 | 0.15 | 0.33 | 11.23 | — | 0.024 | 0.011 | 0.0020 | 0.11 | 0.011 | 0.0008 | 0.021 | 0.0024 | — | 44.4 | 816 | 47 |
| 11 | J | 0.017 | 0.11 | 0.21 | 11.30 | 0.0023 | 0.032 | — | 0.0021 | 0.10 | 0.010 | — | 0.023 | 0.0018 | — | 29.1 | 782 | 35 |
| 12 | K | 0.020 | 0.09 | 0.20 | 10.02 | 0.0007 | 0.039 | — | 0.0005 | 0.099 | — | — | 0.024 | 0.0098 | — | 20.1 | 684 | 15 |

The results in Table 2 can lead to the following consideration.

First, weld metals No. 1 to No. 10 in Table 2 are examples (Invention Examples) using wires A to I in Table 1 satisfying the requirements of the present invention. Although each of the weld metals No. 1 to No. 10 in Table 2 was subjected to welding with a high heat input of 10.0 kJ/mm or more, the weld metal satisfied tensile strength TS>690 MPa and exhibited a SA value as high as 30% or more. As a result, the weld metal had an absorbed energy $vE_{-196°C}$ of 40 J or more. Thus, the weld metal excellent in both the tensile strength and the cryogenic toughness was obtained.

On the other hand, weld metals No. 11 and No. 12 in Table 2 are examples (Comparative examples) using wires J and K of Table 1 not satisfying the requirements of the present invention. These examples had the following defects.

REM was not added to the wire J. The weld metal No. 11 which was produced by use of the wire J was low in SA and inferior in cryogenic toughness.

REM was not added to the wire K. In addition thereto, the content of Ni of the wire K was lower than a predetermined value. The weld metal No. 12 produced by use of the wire K was low in SA and inferior in cryogenic toughness, and also exhibited a low value of tensile strength TS, as low as less than 690 MPa.

Although the present invention has been described above in detail based on the aforementioned specific examples, the present invention is not limited to the aforementioned specific examples, but any modification or change can be made thereon without departing from the category of the present invention.

Although various embodiments have been described above with reference to the drawings, it is a matter of course that the present invention is not limited to such examples. It is obvious that those skilled in the art can arrive at various modifications or changes within the category stated in claims. It should be therefore understood that those modifications or changes rightfully belong to the technical scope of the present invention. In addition, the respective constituent elements in the aforementioned embodiments may be combined desirably without departing from the gist of the invention.

The present application is based on Japanese Patent Application No. 2018-095768 filed on May 17, 2018, and Japanese Patent Application No. 2019-089329 filed on May 9, 2019, the whole contents of which are incorporated herein by reference.

REFERENCE SIGNS LIST 1 copper backing plate
2 sliding copper backing plate

The invention claimed is:

1. A solid wire, comprising Fe and, by mass % based on a total mass of the solid wire:
   C: more than 0% and 0.010% or less;
   Si: more than 0% and 0.10% or less;
   Mn: more than 0% and 0.25% or less;
   Ni: 10.5% to 14.0%;
   S: more than 0% and 0.010% or less;
   Al: more than 0% and 0.250% or less;
   REM: 0.002% to 0.080%;
   Cu: more than 0% and 1.00% or less; and
   O: more than 0% and 0.0090% or less,
   Cr: 0.5% or less,
   with the balance being Fe as a main component and unavoidable impurities, and optionally the solid wire plated with Cu.

2. The solid wire of claim 1, further comprising, by mass % based on the total mass of the solid wire:
   Ca: 0.005% to 0.050%; and/or
   Mg: 0.001% to 0.020%.

3. The solid wire of claim 1, further comprising, by mass % based on the total mass of the solid wire, at least one element selected from the group consisting of:
   Mo: more than 0% and 0.50% or less;
   W: more than 0% and 0.50% or less;
   Nb: more than 0% and 0.10% or less;
   V: more than 0% and 0.10% or less; and
   B: more than 0% and 0.010% or less,
   wherein the solid wire satisfies the following relationship (1):

$$Cr+Mo+W \leq 0.50 \qquad (1).$$

4. The solid wire of claim 1, which is plated with Cu.

5. The solid wire for electroslag welding according to claim 2, further comprising, by mass % based on total mass of the wire, at least one element selected from the group consisting of:
   Mo: more than 0% and 0.50% or less;
   W: more than 0% and 0.50% or less;
   Nb: more than 0% and 0.10% or less;
   V: more than 0% and 0.10% or less; and
   B: more than 0% and 0.010% or less,
   wherein the solid wire for electroslag welding satisfies the following relationship (1):

$$Cr+Mo+W \leq 0.50 \qquad (1).$$

6. A weld joint comprising a weld metal, the weld metal comprising Fe and, by mass %:
   C: more than 0% and 0.07% or less;
   Si: more than 0% and 0.30% or less;
   Mn: more than 0% and 0.40% or less;

Ni: 10.5% to 14.0%; S: more than 0% and 0.0065% or less;
Al: 0.008% to 0.220%,
O: more than 0% and 0.040% or less; and
N: 0% or more and 0.010% or less,
Cr: 0.5% or less;
Cu: more than 0% and 1.00% or less,
with the balance being Fe as a main component and unavoidable impurities,
wherein a total area fraction SA (%) of high-angle grains with an equivalent circle diameter of 5 μm to 30 μm among high-angle grains surrounded by grain boundaries with a crystal orientation of 15° or more is 30% or more.

7. The weld joint of claim 6, wherein the weld metal further comprises, by mass %:
a rare earth metal (REM): more than 0% and 0.040% or less.

8. The weld joint of claim 6, wherein the weld metal further comprises, by mass %, at least one element selected from the group consisting of:
Ca: 0.0003%-0.010%,
Mo: more than 0% and 0.50% or less;
W: more than 0% and 0.50% or less;
Nb: more than 0% and 0.10% or less;
V: more than 0% and 0.10% or less; and
B: more than 0% and 0.010% or less,
wherein the weld metal satisfies the following relationship (2):

$$Cr+Mo+W \leq 0.50 \qquad (2).$$

9. The weld joint of claim 7, wherein the weld metal further comprises, by mass %, at least one element selected from the group consisting of:
Ca: 0.0003%-0.010%,
Mo: more than 0% and 0.50% or less;
W: more than 0% and 0.50% or less;
Nb: more than 0% and 0.10% or less;
V: more than 0% and 0.10% or less; and
B: more than 0% and 0.010% or less,
wherein the weld metal satisfies the following relationship (2):

$$Cr+Mo+W \leq 0.50 \qquad (2).$$

10. The weld joint of claim 6, wherein a steel plate comprising 5% to 10% of Ni is employed as a base metal.

* * * * *